L. A. BRADFORD.
SPOKE SOCKET.
APPLICATION FILED MAR. 14, 1912.
1,035,943.
Patented Aug. 20, 1912.
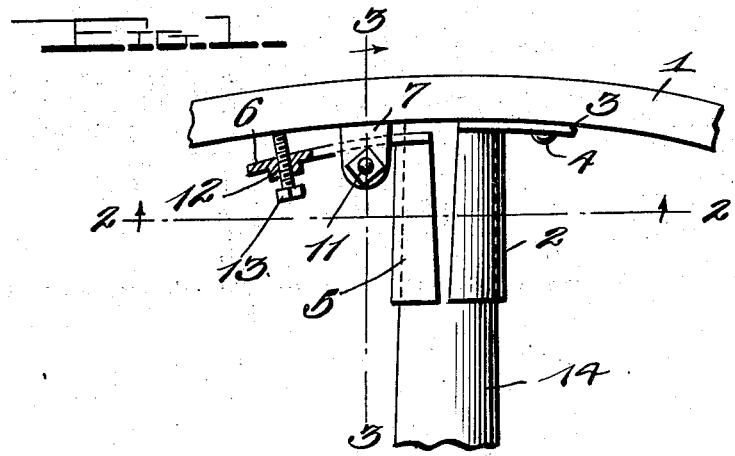
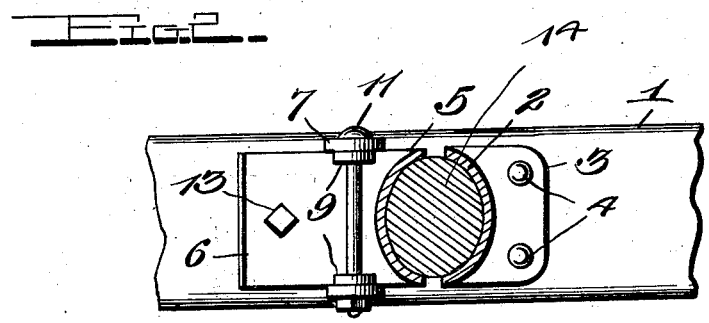
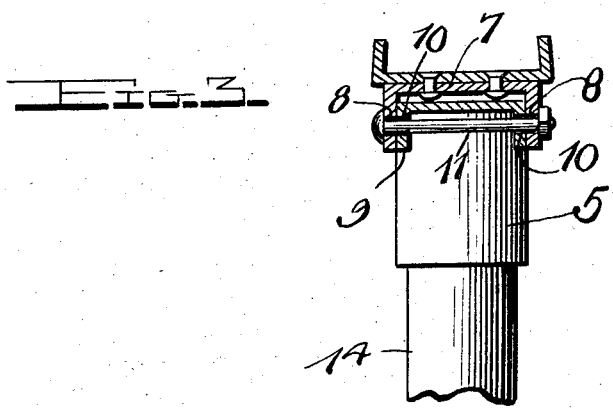
Inventor
L. A. Bradford,
Witnesses
By Watson E. Coleman.
Attorney

UNITED STATES PATENT OFFICE.

LAWRENCE ALLEN BRADFORD, OF FLEMINGSBURG, KENTUCKY.

SPOKE-SOCKET.

1,035,943.  Specification of Letters Patent.  Patented Aug. 20, 1912.

Application filed March 14, 1912. Serial No. 683,793.

*To all whom it may concern:*

Be it known that I, LAWRENCE ALLEN BRADFORD, a citizen of the United States, residing at Flemingsburg, in the county of Fleming and State of Kentucky, have invented certain new and useful Improvements in Spoke-Sockets, of which the following is a specification, reference being had to the accompanying drawings.

This invention relates to new and useful improvements in spoke sockets and has for its object to provide a socket whereby broken spokes can be readily removed and replaced without taking the entire wheel apart.

Another object of the invention is to provide a device of this character which will possess advantages in points of efficiency and durability, will be inexpensive of manufacture and at the same time will be simple in construction and operation.

With the above and other objects in view the invention consists in the novel features of construction and the combination and arrangement of parts hereinafter more fully described, pointed out in the claims and shown in the accompanying drawings in which, Figure 1 is a side elevation showing the application of my improved spoke socket; Fig. 2 is a sectional view on the line 2—2 of Fig. 1; and Fig. 3 is a sectional view on the line 3—3 of Fig. 1.

Referring more particularly to the drawings, 1 indicates the rim of the wheel having my improved spoke socket secured thereto. The socket is formed in two sections, one rigidly secured to the rim and the other movably secured to the rim. The section which is rigidly secured to the rim comprises a semi-circular socket section 2 having an angular plate 3 formed integral therewith and rigidly secured to the rim by means of the rivets or bolt 4.

The section which is movably secured to the rim comprises a semi-circular socket section 5 having the angular plate 6 formed integral therewith and extending at right angles therefrom. A U-shaped member 7 is secured to the rim 1 and has bearing openings 8 formed in its ends. Laterally extending ears 9 are formed integral with the plate 6 at the inner end thereof and provided with the openings 10 adapted to receive the pivot bolt 11 which is mounted in the openings 8 in the ends of the U-shaped member.

A threaded opening 12 is formed in the outer end of the plate 6 adapted to receive the adjusting screw 13, said screw having its end bearing against the rim of the wheel, whereby the manipulation of the screw will force the socket section 5 into clamping engagement with the spoke 14 to hold the spoke securely in place.

To remove a broken spoke the adjusting screw is released and the pivot bolt 11 is taken out so that the socket section 5 can be removed to entirely release the end of the spoke, a new spoke is put in and the socket section secured back in place.

From the above description taken in connection with the drawings it will be seen that I have provided a simple, durable and efficient spoke socket whereby broken spokes can be readily removed and replaced without taking the entire wheel apart.

While I have shown and described the preferred form of my invention it will be obvious that various changes in the details of construction and in the proportions may be resorted to for successfully carrying my invention into practice without sacrificing any of the novel features or departing from the scope thereof as defined by the appended claims.

What I claim is:—

1. A spoke socket comprising a socket section designed for rigid connection to the rim of a wheel, a relatively movable socket section formed with an angularly disposed plate, supporting means to which said angular plate is pivotally connected intermediate of its ends, said supporting means being also assigned for attachment to a wheel rim, and an adjusting screw carried by the outer end of said plate and adapted to engage the rim of a wheel to force the movable section toward the first named section, for the purpose specified.

2. A spoke socket comprising a relatively rigid socket section designed for attachment to the rim of a wheel, a relatively movable socket section provided with an angularly disposed plate, a U-shaped member adapted for attachment to the rim of a wheel, the said plate being formed with ears pivotally connected to the ends of the U-shaped member, and an adjusting screw carried by the outer end of said plate and adapted to engage the rim of a wheel to force the movable section toward the rigid section, for the purpose specified.

3. A spoke socket comprising a socket section formed with an angularly disposed plate designed for rigid connection to the rim of a wheel, a relatively movable socket section provided with an angularly disposed plate, a U-shaped member adapted to be secured to the rim of a wheel, the said plate being formed on each side with an ear, a pivot passing through said ears and through the ends of the U-shaped member and pivotally connecting said member and the said plate, the plate being formed at its outer end with a threaded opening, and an adjusting screw working in said opening and adapted to engage the rim of a wheel to force the movable section toward the rigid section, for the purpose specified.

In testimony whereof I hereunto affix my signature in the presence of two witnesses.

LAWRENCE ALLEN BRADFORD.

Witnesses:
LOUIE F. LYONS,
J. M. McINTIRE.

Copies of this patent may be obtained for five cents each, by addressing the "Commissioner of Patents, Washington, D. C."